(12) United States Patent
Rezaei et al.

(10) Patent No.: US 11,831,676 B2
(45) Date of Patent: *Nov. 28, 2023

(54) FOOTPRINT DATA TO PREVENT MAN-IN-THE-MIDDLE ATTACKS

(71) Applicant: Visa International Service Association, San Francisco, CA (US)

(72) Inventors: Fahimeh Rezaei, Mountain View, CA (US); Marc Kekicheff, Foster City, CA (US); Yuexi Chen, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 17/394,261

(22) Filed: Aug. 4, 2021

(65) Prior Publication Data

US 2021/0367969 A1 Nov. 25, 2021

Related U.S. Application Data

(63) Continuation of application No. 16/434,081, filed on Jun. 6, 2019, now Pat. No. 11,115,436.

(51) Int. Cl.
*H04L 29/06* (2006.01)
*H04L 9/40* (2022.01)

(52) U.S. Cl.
CPC ...... *H04L 63/1466* (2013.01); *H04L 63/0876* (2013.01); *H04L 63/108* (2013.01)

(58) Field of Classification Search
CPC ............. H04L 63/1466; H04L 63/0876; H04L 63/108
See application file for complete search history.

(56) References Cited

U.S. PATENT DOCUMENTS

| | | |
|---|---|---|
| 9,301,141 B1 | 3/2016 | Mincher et al. |
| 9,420,336 B1 | 8/2016 | Woodhead et al. |
| 10,699,545 B1 | 6/2020 | Chan et al. |
| 2016/0112878 A1 | 4/2016 | Kaushik |
| 2016/0135050 A1 | 5/2016 | Dipaola |
| 2016/0277380 A1 | 9/2016 | Wagner et al. |
| 2018/0144563 A1 | 5/2018 | Reymann |

OTHER PUBLICATIONS

PCT Application No. PCT/US2018/062759 as filed on Nov. 28, 2018.

*Primary Examiner* — Vance M Little
(74) *Attorney, Agent, or Firm* — Kilpatrick Townsend & Stockton LLP

(57) ABSTRACT

Systems and methods are disclosed for preventing relay or replay attacks using time-stamped, localized footprint data. An access device may receive, from one or more beacon transmitters, a plurality of broadcast messages, each broadcast message, of the plurality of broadcast messages, comprising a timestamp and a unique identifier for a beacon transmitter, of the one or more beacon transmitters. The access device may store the timestamps and the unique identifiers. The access device may receive, from a user device, an access request comprising timestamps and unique identifiers corresponding to a subset of the broadcast messages received by the access device. The access device may verify that the stored timestamps and unique identifiers match the timestamps and unique identifiers received from the user device. Based on the verifying, the access device may authenticate the access request.

20 Claims, 7 Drawing Sheets

FOOTPRINT DATA TO PREVENT MAN-IN-THE-MIDDLE ATTACKS

CROSS-REFERENCES TO RELATED APPLICATIONS

This application is a continuation of U.S. application Ser. No. 16/434,081, filed Jun. 6, 2019, the entirety of which is incorporated herein by reference for all purposes.

BACKGROUND

Man-in-the-middle attacks are possible in contact and contactless access requests. For example, a user may, via a wireless device, request access to location using a smart lock, or request access to a good or service using a contactless access device. In one type of man-in-the middle attack, a "relay attack," one or more attackers "relay" misappropriated information using two devices, such as wireless-enabled mobile devices. In an example relay attack, an attacker uses a first mobile device with a first mobile application to tap and communicate with a contactless device in a victim's pocket. The attacker, or another attacker working in cooperation, uses a second mobile device with a second mobile application to tap and communicate with a contactless access device. Command messages issued by the contactless access device are relayed from the second mobile device to the first mobile device and are then received by the victim's contactless device. The victim's contactless device then responds to the command messages. Access information on the device is relayed from the first mobile device to the second mobile device and then to the contactless access device. By performing such a relay attack, the attacker can access a resource using the victim's contactless device without taking victim's device from the victim's possession. Another type of man-in-the middle attack is a "replay attack." In a replay attack, an attacker intercepts data from a user device and uses the data to "replay" an access request at a later time, generally in the same location.

Mobile transactions that use Bluetooth Low Energy (BLE) to communicate between a contactless device and a contactless access device typically occur with a relatively close proximity between the device and the access device. However, these transactions are still susceptible to man-in-the middle attacks.

The embodiments described herein solve these problems, both individually and collectively.

BRIEF SUMMARY

One embodiment of the disclosure is directed to a method performed by an access device. The method comprises receiving, at an access device from one or more beacon transmitters, a plurality of broadcast messages, each broadcast message, of the plurality of broadcast messages, comprising a timestamp and a unique identifier for a beacon transmitter, of the one or more beacon transmitters. The access device stores the timestamps and the unique identifiers. The access device receives, from a user device, an access request comprising timestamps and unique identifiers corresponding to a subset of the broadcast messages received by the access device. The access device verifies that the stored timestamps and unique identifiers match the timestamps and unique identifiers received from the user device. Based on the verifying, the access request may be authenticated.

Another embodiment of the disclosure is directed to an access device. In some embodiments, the access device comprises a processor and a non-transitory computer readable medium. The computer-readable medium comprises code, executable by the processor, for implementing any of the methods described herein.

Another embodiment of the disclosure is directed to a method performed by a user device. The method comprises receiving, at a user device from a one or more beacon transmitters, plurality of broadcast messages, each broadcast message, of the plurality of broadcast messages, comprising a timestamp and a unique identifier. The user device prepares and transmits, to an access device, an access request comprising a set of timestamps and unique identifiers corresponding to the broadcast messages received by the user device. This causes the access device to verify that a set of stored timestamps and unique identifiers match the set of timestamps and unique identifiers received from the user device, and, based on the verifying, authenticate the access request.

DETAILED DESCRIPTION

Figure 1A:
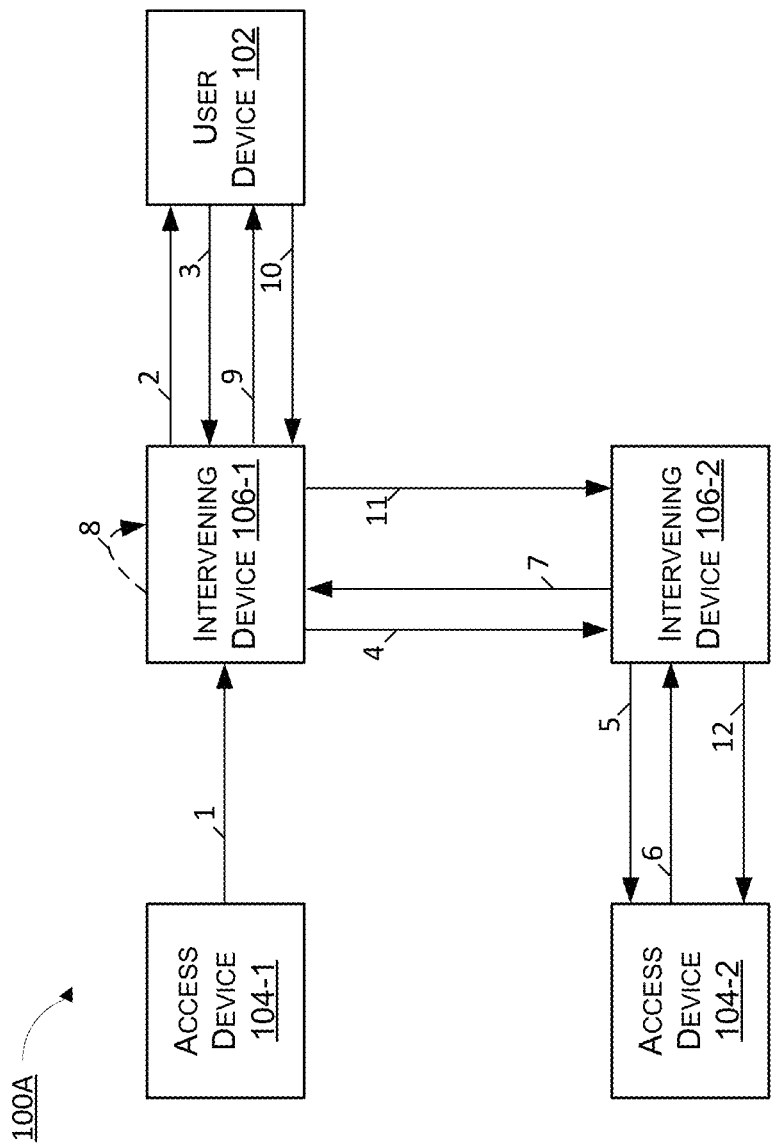
FIG. 1A is a block diagram illustrating an example of a relay attack, according to some embodiments.

Bluetooth Low Energy (BLE) is a communications technology that is available in most modern smart phones. BLE technology can be used for interactions such as mobile payments. A feature of BLE that potentially makes it attractive for low-friction interactions is that establishing a connection between devices (such as an access device and a user's phone) is relatively easy. For example, when connecting one device to another, there is no need to exchange a PIN or passphrase, as is the case for some modes of Bluetooth.

However, the widespread availability of BLE capabilities in user devices, together with the simplicity of establishing a BLE connection between user devices and access devices, unfortunately entices fraudsters to develop mobile applications that can mimic a BLE access device. Without protections, it is possible for a fraudster to perform a man-in-the-middle attack.

I. Definitions

Prior to discussing specific embodiments of the invention, some terms may be described in detail.

A "user device" may comprise any suitable electronic device that may be operated by a user. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc. A user device may also provide remote communication capabilities to a network. Examples of remote communication capabilities include using a mobile phone (wireless) network, Bluetooth®, Bluetooth Low Energy® (BLE), wireless data network (e.g. 3G, 4G or similar networks), Wi-Fi, Wi-Max, or any other communication medium that may provide access to a network such as the Internet or a private network. A user device may comprise any suitable hardware and software for performing such functions, and may also include multiple devices or components (e.g. when a device has remote access to a network by tethering to another device—i.e. using the other device as a modem—both devices taken together may be considered a single user device).

An "application" may be computer code or other data stored on a computer readable medium (e.g. memory element or secure element) that may be executable by a processor to complete a task.

A "user" may include an individual. In some embodiments, a user may be associated with one or more personal accounts and/or mobile devices. The user may also be referred to as a cardholder, account holder, or consumer.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "resource provider identifier" can include any suitable type of information that can identify a resource provider or a location of a resource provider. Examples of resource provider identifiers may include a merchant ID, a store ID, a device ID of a device at a resource provider location, a major value (e.g., a store major value), a minor value (e.g., a store minor value), etc.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a user device, a resource provider computer, a processing network computer, an authorizing entity computer, and/or any other suitable system. An access device may generally be located in any suitable location, such as at the location of a merchant, or at an access location of a building as another example. An access device may be in any suitable form. Some examples of access devices include POS or point-of-sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user device. In some embodiments, an access device may be configured to communicate with a user device based at least in part on a short-range communications protocol such as Bluetooth® and/or BLE. In some embodiments, an access device may be further configured to utilize any suitable wired and/or wireless network to communication with a resource provider computer, a processing network computer, an authorizing entity computer, and/or any other suitable system. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

"Access data" may include any suitable data that can be used to access a resource or create data that can access a resource. As an example, the resource may be a location and the access data may include data that can be used to access the location, such as ticket information for an event, data to access a building, transit ticket information, etc. As another example, access data could include data that can be used to obtain a resource, such as payment data. Examples of payment data may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment data may be any information that identifies or is associated with a payment account. Payment data may be provided in order to make a payment from a payment account. Payment data can also include a user name, an expiration date, a gift card number or code, and any other suitable information.

An "account identifier" may include an identifier for an account. An account identifier may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

The term "access request" generally refers to a request to access a resource. The access request may be received from a requesting computer, a user device, or a resource computer, for example. The access request may include access data, as described above.

An "authorization request message" may be an electronic message that requests authorization for a transaction. In some embodiments, an authorization request message is sent to a processing system and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "access data" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a processing system. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the processing system) to the merchant's access device (e.g. POS equipment) that indicates approval of the transaction. The code may serve as proof of authorization. As noted above, in some embodiments, a processing system may generate or forward the authorization response message to the merchant.

A "transport computer" may include a computer that can transport data. In some embodiments, it may refer to a computer that processes electronic payment communications on behalf of a resource provider system. In some embodiments, a transport computer may receive authorization requests and settlement communications originating from a source address of a resource provider system, as well as authorization responses from source addresses of authorizing computers. In some embodiments, a transport computer may be associated with an "acquirer," which may typically be a business entity (e.g., a commercial bank) that has a business relationship with a particular resource provider or other entity. Some entities can perform both issuer and acquirer functions. Some embodiments may encompass such single entity issuer-acquirers.

A "broadcast message" or "advertisement message" is a one-way communication method. Devices, such as BLE beacons that want to be "discovered" can broadcast self-contained packets of data in set intervals. These packets are meant to be collected by devices like smartphones, where they can be used for a variety of smartphone applications to trigger things like push messages, application actions, and prompts.

"Broadcast data" may include any suitable information associated with one or more broadcast messages (e.g., from a beacon transmitter). Broadcast data may include timestamps (e.g., indicating the time at which the broadcast message was transmitted), unique identifiers (e.g., a universally unique Identifier (UUID) or namespace of a Bluetooth Low Energy (BLE) beacon), and/or random numbers. Broadcast data may further comprise resource provider identifiers, identifiers of access devices, and other information.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

An "interaction" may be a reciprocal action of influence. Examples of interactions may include transactions such as payment transactions, data access transactions, and secure location access transactions.

II. Relay and Replay Attacks

Figure 1B:
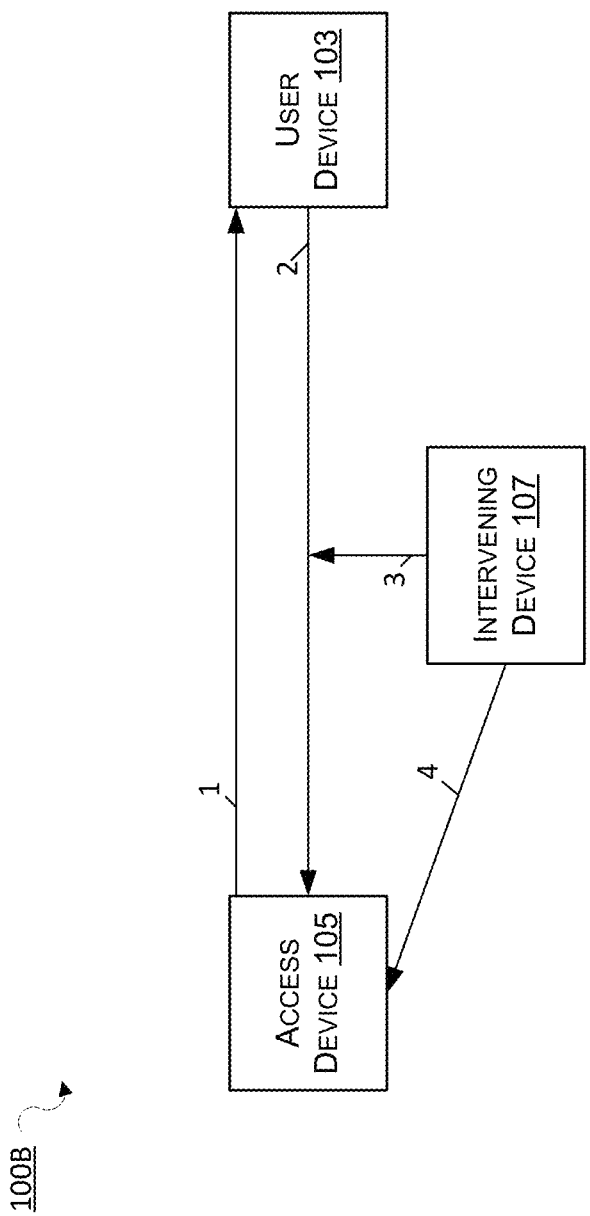
FIG. 1B is a block diagram illustrating an example of a replay attack, according to some embodiments.

FIGS. 1A and 1B illustrate examples of man-in-the middle attacks. In a relay attack, as shown in FIG. 1A, two intervening devices are used to conduct an interaction, using misappropriated data, in a different location. In a replay attack, as shown in FIG. 1B, an intervening device intercepts data and reuses it to conduct an interaction at a later time, potentially at the same location.

A. Relay Attacks

FIG. 1A is a block diagram 100A illustrating an example of a relay attack. The example depicted in FIG. 1A shows how fraudsters may compromise an interaction between a user device 102 and an access device 104-1 using a relay attack. FIG. 1A includes a user device 102, an access device 104-1, an access device 104-2, an intervening device 106-1, and an intervening device 106-2. As an example, the access devices 104-1 and 104-2 may each be situated at separate fuel pump devices (and/or operating as part of a respective fuel pump device) at one or more gas stations.

At step 1, access device 104-1 (e.g., located at gas station "SuperGas" at Pump 1) transmits a broadcast message (e.g., via a short-range wireless protocol such as BLE). The broadcast message may at least include broadcast data. The broadcast data may include identification data associated with the access device 104-1. By way of example, the broadcast data may include an identifier of a resource provider (e.g., a merchant, such as "SuperGas," "SuperGas at $4^{th}$ and Broadway, Seattle, Wash.", or the like). In some embodiments, the identification data associated with the access device 104-1 may further include a device identifier (e.g., "pump 1"). The user device 102 may approach the access device 104-1 to breach a threshold distance from the access device 104-1 (e.g., within range of receiving short-range wireless messages of the short-range wireless communications protocol such as BLE).

At step 2, an intervening device 106-1, operated by a first fraudster, intercepts the broadcast message and relays the message to the user device 102. In some embodiments, the intervening device 106-1 may alter the broadcast message (e.g., the identification data) prior to relaying the message to the user device 102, while in other embodiments, the intervening device 106-1 may leave the broadcast message unaltered.

At step 3, the user device 102 receives the broadcast message and displays one or more user interfaces for confirming a connection with the access device 104-1. Upon presenting the user interface and receiving an indication that the user has confirmed an intent to establish a connection with "SuperGas, Pump 1," a connection may be established utilizing any suitable short-range wireless protocol (e.g., BLE) between the intervening device 106-1 and the user device 102. Thus, based on relaying the message at step 2, a fraudster may establish a BLE connection between a first fraudulent contactless device (intervening device 106-1) and the user device 102. The user of the user device 102 may believe (e.g., based on the text provided in the user interface) that the user is connecting to the access device 104-1. However, the user device 102 may actually be connected to the fraudster's device (e.g., intervening device 106-1).

Once the connection between the intervening device 106-1 and the user device 102 is established, the intervening device 106-1 can connect (or otherwise transmit data), via any suitable wired and/or wireless connection, to an accomplice's second fraudulent device (e.g., intervening device 106-2) at step 4. The intervening device 106-2 can be located at, for example, another access device (e.g., an access device located at another gas station, "OtherGas," at "Pump 4"). The intervening device 106-2 may connect (or otherwise transmit data) via a second BLE connection to the access device 104-2 at step 5.

In this fraudulent transaction flow, the intervening device 106-2 receives data (e.g., broadcast data including identification data associated with the access device 104-2, access data such as a pre-authorization amount, etc.) from the access device 104-2. The intervening device 106-2 may relay the received interaction data to the intervening device 106-1 at step 7.

In some attacks, at step 8, the intervening device 106-1 (and/or the intervening device 106-2) may alter the data provided by the access device 104-2. For example, the intervening device 106-1 may alter the broadcast data to indicate that the broadcast data was provided by the access device 104-1 rather than the access device 104-2. More specifically, intervening device 106-1 and/or 106-2 may alter the identification data associated with "OtherGas, Pump 4" to "SuperGas, Pump 1." This altered identification data may be relayed to the user device 102 at step 9. Reception of this altered identification data may cause the user device 102 to present another user interface confirm an interaction between the user device 102 and the intervening device 106-1 purporting to be the access device 104-1. For example, the user interface may display text indicating that the interaction is to be conducted with "Access Device 1, terminal 1." The text may indicate that an interaction is to occur with access device 104-1 (e.g., "Proceed with pre-authorizing $99 at SuperGas, Pump 1.").

Returning to the ongoing example of FIG. 1, since intervening device 106-1 has previously presented itself as "SuperGas, Pump 1" to the user device 102, the user may be fooled into thinking that his user device 102 is interacting with the access device 104-1 (e.g., the "SuperGas" pump located near the user device 102) to perform the transaction, when in fact it is actually interacting with the access device 104-2 (the "OtherGas" pump) via intervening devices 106-1 and 106-2. As a result, the user may indicate his intent to perform the interaction, thinking the interaction is with SuperGas, Pump 1, when in fact the user device 102 is not interacting with access device 104-1 at all.

Upon receiving an indication that the user intends to perform the interaction, the user device 102 may be configured to provide access data at step 10. For example, an application operating on the user device 102 may generate chip data, which is relayed via intervening device 106-1 to intervening device 106-2 at step 11. At step 12, the intervening device 106-2 provides the access data to the access device 104-2.

This may enable the fraudster's accomplice (e.g., operating intervening device 106-2) to fill their own gas tank, potentially for a much larger amount than the real user intended. In a simple relay attack situation, the real user may not even get a chance to fill their own tank. That is, intervening device 106-1 could simply terminate the BLE connection with the user device 102 as soon as it has the data necessary to perform the fraudulent transaction.

It can be appreciated that there are many variations to this type of attack. The above description is only one example. It can also be appreciated that the provider of access device 104-1 (e.g., a merchant "SuperGas") is not in collusion with the fraudster. As far as the provider of the access device 104-2 (e.g., a merchant "OtherGas") is concerned, the intervening device 106-2 appears to be the device of a genuine user. As a result, the provider of the access device 104-2 is also unknowingly made a party to the fraudulent transaction.

The relay attack described above is possible because, among other reasons, there is no check that the access device with which the user believes the user is interacting is the same as the access device with which the actual interaction is being performed.

B. Replay Attacks

FIG. 1B is a block diagram 100B illustrating an example of a replay attack. A replay attack is similar to a relay attack, but may involve a same access device at a different time. For example, with reference to FIG. 1B, an intervening device 107, operated by a fraudster, may intercept a message from user device 102 and replay the message to the access device 105. In some embodiments, the intervening device 107 may alter the message prior to replaying the message, while in other embodiments, the intervening device 107 may leave the message unaltered.

At step 1, the access device 105 sends a broadcast message to the user device 102. The broadcast message may include identification data such as an identifier of the access device 105. The user of the user device 102 prepares an access request message. The access request message may include access data such as a PAN and an amount. The access request message may further include the identifier of the access device. In some embodiments, the access request message may be encrypted by the user device 103.

At step 2, the user device 103 transmits the access request message to the access device 105. The access request message may be used to conduct an interaction between the access device 105 and the user device 103.

At step 3, the intervening device 107 intercepts the access request message transmitted by the user device 103. The intervening device 107 may take or copy the entire access request message in the course of transmission.

In some embodiments, the access request initiated by the user may proceed. For example, using the access data in the message, the access device may initiate transaction processing operations. The user may be authenticated using data comprised in the message. Authorization, clearing, and settlement may occur to pass funds from an account of the user to a resource provider associated with the access device. Alternatively, the intervening device may intercept the message without the intended access request going through. Intervening device 107 could simply terminate the BLE connection with the user device 102 as soon as it has the data necessary to perform the fraudulent transaction.

At step 4, the intervening device 107 transmits the intercepted access request message, in whole or in part, to the access device. In some embodiments, the intervening device 107 may replay an encrypted data packet without altering the data packet. For example, the intervening device 107 could send an access request message which has been signed by user device 103 at a later time to fraudulently perform an interaction such as opening a smart lock. In other embodiments, the intervening device 107 may modify the access request message, e.g., by changing a numerical value used to identify the access request and/or changing transaction details. For example, the intervening device may take an access request message for sending a shirt to the user's address and alter data fields therein so that the message specifies to send a fur coat to the fraudster's address using the user's payment information. The replay attack described above is possible because, among other reasons, there is no check as to the time at which the broadcast was sent to the user device 103.

III. Preventing Attacks Using One or More Beacon Transmitters

A. System Overview

Figure 2:
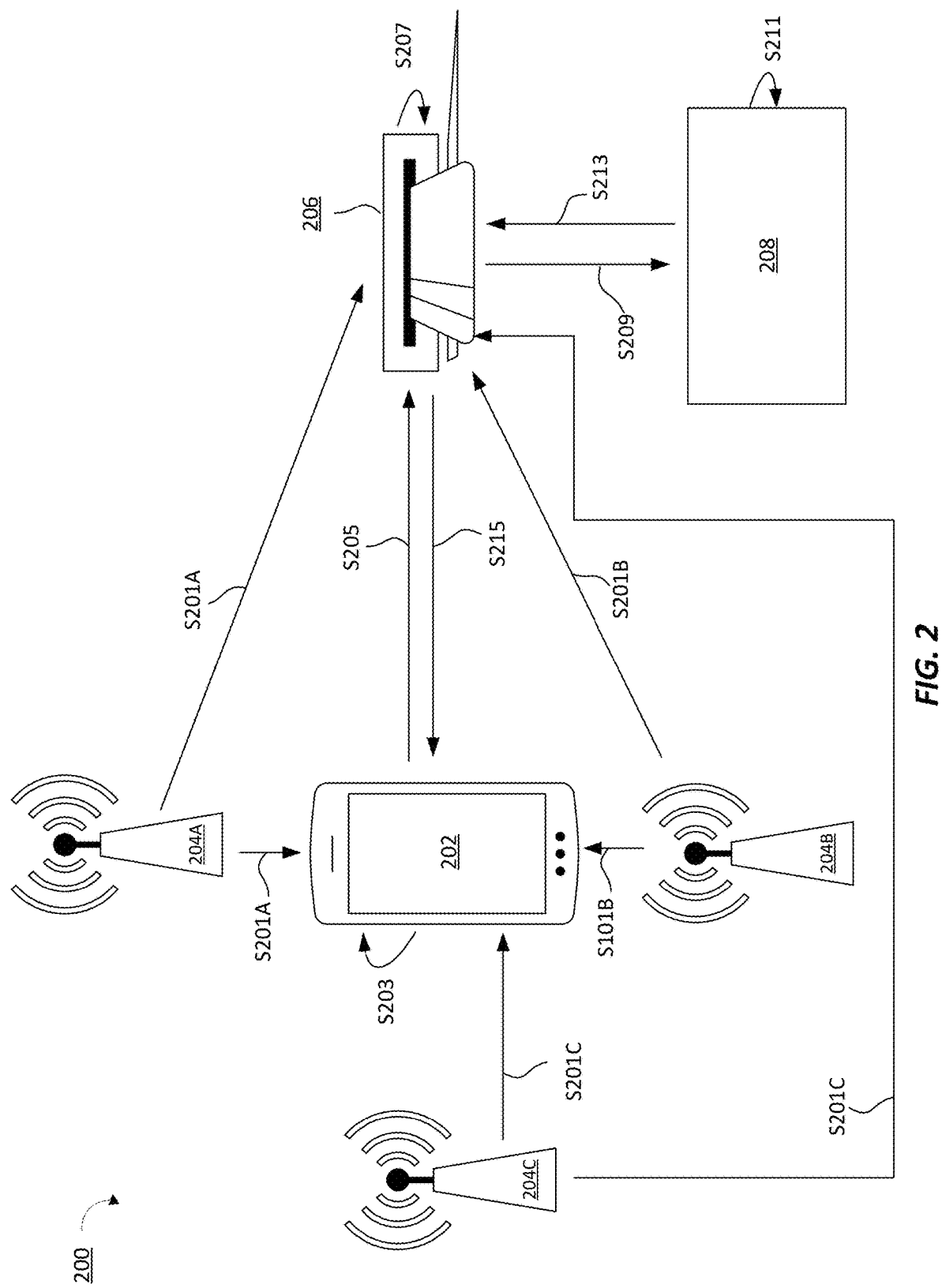
FIG. 2 shows a block diagram illustrating a method for preventing a man-in-the-middle attack using multiple beacon transmitters, according to some embodiments.

FIG. 2 shows a schematic diagram illustrating a system 200 according to some embodiments. The system 200 comprises a user device 202, an access device 206, and a plurality of beacon transmitters 204A, 204B, and 204C. System 200 further comprises a processing system 208. For simplicity of illustration, a certain number of components are shown in FIG. 2. It is understood, however, that embodiments may include more than one of each component. In addition, some embodiments may include fewer than or greater than all of the components shown in FIG. 2.

The user device 202 may be any suitable user device, such as a smartphone, smartwatch, and/or the like. The user device 202 may include a mobile application ("access application") capable of monitoring for broadcast messages and managing access requests. The user device 202 may be substantially similar to the user device 502 described in detail below with respect to FIG. 5.

In some embodiments, the user device 202 may be configured with encryption data. In some embodiments, the encryption data may include a certificate issued by a certificate authority (not depicted). In some embodiments, the certificate can be a Europay, Mastercard® and Visa® (EMV) certificate. In some embodiments, the certificate may include a public key associated with the user device 202 as digitally signed by the certificate authority utilizing a private key associated with the certificate authority. The encryption data may further include a private key (e.g., a private key associated with the certified public key that is digitally signed by the certificate authority) that is associated with the user device 202.

A user (not shown) may operate the user device 202. If the user is an authentic user, then the user device 202, the access device 206, and the beacon transmitters 204A, 204B, and 204C would all be at the same location (e.g., the same merchant, the same entrance to a venue, etc.).

The communication between user device 202 and the access device 206 and/or beacon transmitters 204A, 204B, 204C can be performed using a secure communication protocol such as transport layer security protocol, secure sockets layer protocol, or other suitable secure communication protocols.

A beacon transmitter (e.g., beacon transmitters 204A, 204B, 204C) may be a device for communicating using a short-range communication protocol (e.g., via a BLE broadcast message). In some embodiments, BLE (Bluetooth Low Energy) technology is used as the short range communication protocol or technology. BLE is a wireless personal area network technology used for transmitting data over short distances. BLE is designed for low energy consumption and cost, while maintaining a communication range similar to classic Bluetooth. BLE communication consists primarily of broadcast messages transmitted at predetermined broadcast intervals via radio waves. An optimal broadcast interval can be 100 milliseconds (ms). Broadcasting more frequently uses more battery life, but allows for quicker discovery by smartphones and other listening devices. Alternatively, or additionally, the beacon transmitters may communicate via other types of short/mid-range wireless communication protocols such as Bluetooth or WiFi. BLE may be particularly desirable, however, due to its low energy consumption, ability to estimate distance of the user communication device, and the ability of auto-connection to a BLE-enabled user device.

Each of the beacon transmitters 204A, 204B, 204C may have a finite range. For example, the range of each beacon transmitter may be from approximately 20 meters (about 66 feet) to approximately 300 meters (about 984 feet). The range may be configurable (e.g., to preserve battery life).

Although three beacon transmitters are shown, there may be any suitable number of beacon transmitters included in the system 200. The appropriate number may vary based on the size and layout of a location, e.g., to avoid overlapping ranges. For example, in a moderately sized store, two beacon transmitters may be appropriate, whereas in a larger store with ten departments, ten beacon transmitters may be appropriate.

The access device 206 is a device for managing requests for access to a resource. The access device 206 is further configured to monitor broadcasts from one or more BLE beacons, and to keep track of such broadcasts for use in validating access requests. Components and functionalities of an example access device are described in detail below with respect to FIG. 4.

In some embodiments, the access device 206 may be configured to generate encryption data. The encryption data may include an uncertified public/private key pair for each access device. The public/private key pairs may be asymmetric key pairs such as Rivest, Shamir, and Adelman (RSA) keys, Elliptic-curve cryptography (ECC) keys, or keys for some other suitable cryptographic algorithm. In some embodiments, the access device 206 may be configured to generate a new public/private key pair for each potential interaction with a user device (e.g., the user device 202). In other embodiments, the access device 206 may be configured to reuse a respective single public/private key pair to perform various interactions with a variety of user devices.

The processing system 208 may include data processing subsystems, networks, and operations used to support and deliver authorization services, exception file services, and clearing and settlement services. For example, the processing system 208 may comprise a server coupled to a network interface (e.g., by an external communication interface), and databases of information. The processing system 208 may be representative of a processing service, such as a transaction processing network. An example transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The processing system 208, which can be implemented as a cloud-based system or as a server computer system, may be remotely located with respect to the user device 202, the access device 206, and the beacon transmitters 204A, 204B, 204C.

The entities in FIG. 2 and the other Figures may communicate using any suitable communications networks. Suitable communications networks may be any one and/or the combination of the following: a direct interconnection; the Internet; a Local Area Network (LAN); a Metropolitan Area Network (MAN); an Operating Missions as Nodes on the Internet (OMNI); mesh networks, a secured custom connection; a Wide Area Network (WAN); a wireless network (e.g., employing protocols such as, but not limited to a Wireless Application Protocol (WAP), I-mode, and/or the like); and/or the like.

B. Preventing Attacks with Multiple Beacon Transmitters

With continued reference to FIG. 2, example operations for preventing attacks with multiple beacon transmitters are shown.

Prior to conducting a transaction, a user may enroll the user device 202 in a processing service by downloading an access application (e.g., a payment application, mobile wallet application, etc.) onto the user device 202. The user may configure the access application with access data, such as one or more account identifiers. Data associated with the user device 102 and the user may be stored by the processing system 208. Once the user is registered, the user walks into a resource provider location (e.g., a merchant store) with the user device 202.

At step S201A, a first beacon transmitter 204A transmits a broadcast message. The broadcast message may be transmitted at predetermined intervals of time. For example, a beacon transmitter may transmit broadcast messages continually at short intervals, such as every 100 ms, every 350 ms, every 200 ms, or every 1000 ms. The intervals may be regular (e.g., every 100 ms), or may vary (e.g., 100 ms, then 200 ms, then 150 ms, etc.)

The broadcast message may comprise broadcast data. The broadcast data may include a timestamp. In some embodiments, the timestamp may be precise enough to account for the above-noted intervals, e.g., to 100 ms, 50 ms, or 10 ms precision. The broadcast message may further comprise a unique identifier which is unique to the beacon transmitter 204A. One type of unique identifier is a Universally Unique Identifier (UUID). A UUID may be a 16-byte string that is used to differentiate beacon transmitters. The UUID may comprise hexadecimal digits, which may be divided into segments. For example, the UUID may comprise 32 hexadecimal digits split into five groups separated by hyphens. The unique identifier may comprise a randomly-generated number. Alternatively, or additionally, the broadcast message may comprise another randomly-generated number, in addition to the unique identifier, for identifying the particular broadcast message (e.g., the beacon transmitter 204A may generate a new random number for each broadcast, to be transmitted along with a UUID).

The broadcast message may include a resource provider identifier (e.g., a merchant identifier (MID)). The broadcast message may include a store ID (SID). Alternatively, or additionally, the broadcast message may include a major value such as a store major value and a minor value such as store minor value. The major value may be a two-byte string used to distinguish a smaller subset of beacon transmitters within a larger group. The minor value may be a two-byte string that is used to identify individual beacon transmitters. The broadcast messages may further include a processing service identifier which identifies a processing service provider corresponding to the processing system 208 (e.g., Visa®).

Similarly, at step S201B, a second beacon transmitter 204B may transmit broadcast messages comprising timestamps, a unique identifier (e.g., a UUID) of beacon transmitter 204B, and/or a randomly generated number. At step S201C, a third beacon transmitter 204C may transmit broadcast messages comprising timestamps, a unique identifier of beacon transmitter 204C, and/or a randomly generated number. Each beacon transmitter may have a different unique identifier to facilitate discerning which beacon transmitter is the origin of a particular broadcast.

The broadcast messages are received by the user device 202 in a particular order. For example, as a user corresponding to the user device 202 walks through a store, the user may pass through the range of the beacon transmitters in the order A, B, C or C, A, B, or so forth. Accordingly, the user device 202 may receive time-stamped, uniquely-identified broadcast messages characteristic of a particular unique footprint. The beacon transmitters may be selected and/or configured based on range to create "zones" in the store so as to generate the footprint. For example, a beacon with a 50-meter range may be placed in a relatively large shoe department. Another beacon with a 20-meter range may be placed in a relatively small hosiery department. Accordingly, if a broadcast was received from the 50-meter-range beacon, it can be determined that the user device was in the shoe department, and if a broadcast was received from the 20-meter-range beacon, it can be determined that the user device was in the hosiery department.

The broadcast messages may additionally be received by the access device 206. If the access device 206 is outside of the range of a particular beacon transmitter, then one or more capture devices (not pictured) may be included in the system 200 for transferring broadcast messages to the access device 206. The capture device(s) may be devices which are within range of the beacon transmitter(s) and capable of forwarding messages to the access device (e.g., over a wired or wireless connection).

Upon receiving the broadcast messages, the access device 206 may store the broadcast data. For example, the access device 206 may store a set of timestamps in association with corresponding unique identifiers. The access device 206 may store the broadcast data to a broadcast database (e.g., broadcast database 422, shown in FIG. 4). The broadcast data may be stored locally or in a remote database, e.g., on the cloud. The access device 206 may continually receive broadcast messages from the beacon transmitters, such that those broadcast messages received by the user device 202 comprise a subset of the broadcast messages received by the access device 206.

At step S203, the user device 202 may prepare an access request. The user device 202 may package together the received broadcast data. For example, a set of received timestamps and unique identifiers may be packaged in chronological order based on the user's path through an area comprising the set of beacon transmitters. As a specific example, a customer walks through a store with the user device 202 and passes three beacon transmitters in the sequence B, C, A with respective timestamps T1, T2, T3. The user device 202 may then create a unique footprint based on the unique identifiers and timestamps such as [B:T1; C:T2; A:T3].

In some embodiments, the user device 202 may sign the timestamps and unique identifiers. As an example, the user device 202 may, at an initial time, receive or generate a key pair (e.g., a symmetric or asymmetric key pair). The access device may receive or generate a corresponding key pair (e.g., a symmetric or asymmetric key pair). The user device 202 may use one of the generated keys to encrypt the unique identifiers and timestamps (e.g., such that the timestamps and the unique identifiers are in a form of a cryptogram). This may result in a string such as [B:T1; C:T2; A:T3] being converted to a number such as 1289975. The user device may send additional data with the access request which is not signed. Alternatively, or additionally, the user device may cryptographically sign the entire access request.

The user device 202 may further prepare the access request to include access data. For example, an access application on the user device 202 may retrieve stored access data such as a PAN, CVV, and/or the like. Such access data may be included in the access request to facilitate payment.

At step S205, the user device 202 transmits the access request to the access device 206. The user device 302 may initially switch to an intent-to-pay mode (e.g., from a listening mode). The user device 302 may connect (e.g., via BLE) to the access device. The user device 302 may transmit the access request to the access device over short range communication, such as BLE. The access device 306 receives the access request.

The user device 202 and/or the user may further transmit, to the access device 206, information about resources requested in the access request. For example, the user may select items to purchase. Information about the items may be conveyed to the access device 206 in various ways. For example, the user may bring the items to a POS terminal to scan. As another example, the user may scan the items with the user device 202 to retrieve data pertaining to the items, which may then be transmitted to the access device 206 as part of the access request. As another example, the items may be stored in association with sensors which notify the access device 206 when a user has picked up an item.

At step S207, the access device 206 verifies that a subset of the stored timestamps, unique identifiers, and/or random numbers match the timestamps, unique identifiers, and/or random numbers received from the user device 202. The access device 206 may query the broadcast database to determine whether corresponding timestamps, unique identifiers, and/or random numbers are stored therein. As an example, if a fraudster at a different location is attempting to send a fraudulent access request, the access request may be missing the necessary unique identifiers and timestamps. Even were the fraudster to identify and include the unique identifiers, it would be highly unlikely that the fraudster could replicate a verifiable set of unique identifiers and timestamps. On the other hand, if both the access device 206 and the user device 202 received a broadcast from beacon transmitter A at timestamp T1 and a broadcast from beacon transmitter B at timestamp T2, then the access device 206 may verify that the received unique identifiers and timestamps match the stored unique identifiers and timestamps. The access device 206 may authenticate the access request based on verifying that the subset of the stored broadcast data matches the received broadcast data (e.g., the access device 206 may, based on the verification, confirm that the user is likely not a fraudulent imposter).

In some embodiments, the verification may involve a comparison of a type of resource to a unique identifier corresponding to a beacon transmitter. As an example, the access request is to buy a pair of shoes (which may be indicated by a code in the access request). The access device 206 verifies that the received and stored unique identifiers include a unique identifier corresponding to a beacon transmitter which is located in a shoe department. The access device 206 may further verify a path from the shoe department to the access device (e.g., by confirming that the access request includes a unique identifier corresponding to a beacon transmitter in a jewelry department, which is located between the shoe department and the access device 206).

In some embodiments, if the unique identifiers and timestamps are in a form of a cryptogram, then the access device 206 may validate the cryptogram. In some embodiments, the cryptogram could be decrypted with a cryptographic key to obtain the unique identifiers and timestamps. This data may be compared to the stored unique identifiers and timestamps to determine whether there is a match. In other embodiments, a separate cryptogram may be calculated by the access device 206 (using the broadcast data, and an appropriate cryptographic key) and this may be compared with the received cryptogram to determine if there is a match. In this example, the separate cryptogram may be generated using a symmetric key, and a corresponding symmetric key may be stored on the user device 202 and may have been used to generate the received cryptogram. In yet other embodiments, the received cryptogram was generated using a private key of a public/private key pair. The received cryptogram can be validated with a public key, a verification algorithm, and the broadcast data. Public key verification methods are known in the art.

At step S209, the access device 206 may prepare and transmit an authorization request message to the processing system 208. The authorization request message may comprise broadcast data, access data, and/or the like. As examples, the authorization request message may comprise access data for a payment transaction or granting access to an Internet-of-things device. The authorization request message may further comprise a flag or other indicator that the access device 206 has authenticated the access request. The access device 206 may transmit the authorization request message to the processing system 208 over a network.

At step S211, the processing system 208 may execute transaction processing operations. Executing transaction processing operations may comprise receiving an authorization request message from an access device 206, and/or from a transport computer (not pictured). For example, the access device 206 may transmit the authorization request message to a transport computer, which forwards the authorization request message to the processing system 208. Executing transaction processing operations may further comprise transmitting the authorization request message to an authorizing entity computer (e.g., a computer associated with a bank that issued a payment account to the user attempting to make a purchase). The processing system 208 may then receive an authorization response message comprising a determination whether to approve or decline the access request. Alternatively, or additionally, the processing system 208 may itself determine whether to authorize the transaction, and generate an authorization response message indicating whether to approve or decline the access request. The authorization operations may be caused by, and/or rely on, the fact that the access device 206 has authenticated the access request at step S207.

At step S213, the processing system 208 may transmit the authorization response message to the access device 206. The processing system 208 may transmit the authorization response message to the access device 206 over a network, e.g., as a message and/or API push. The authorization response message, indicating whether the access request was approved or declined, is received by the access device 206.

At step S215, the access device 206 may transmit a message to the user device 302 indicating the results (e.g., whether the access request was approved or declined). If the access request was approved, then the access device 306 may transmit a confirmation message to the user device 302 indicating approval. If the access request was declined, then the access device 306 may transmit a notification to the user device 302 indicating the decline.

At the end of the day or at some other period of time, a clearing and settlement process can take place.

C. Preventing Attacks with One Beacon Transmitter

In some situations, multiple beacon transmitters may not be feasible or desirable. For example, in a small store, it may not be feasible to include a second beacon transmitter which is outside of the range of a first beacon transmitter. In this case, attacks may be prevented using one beacon transmitter, as described with respect to FIG. 3.

Figure 3:
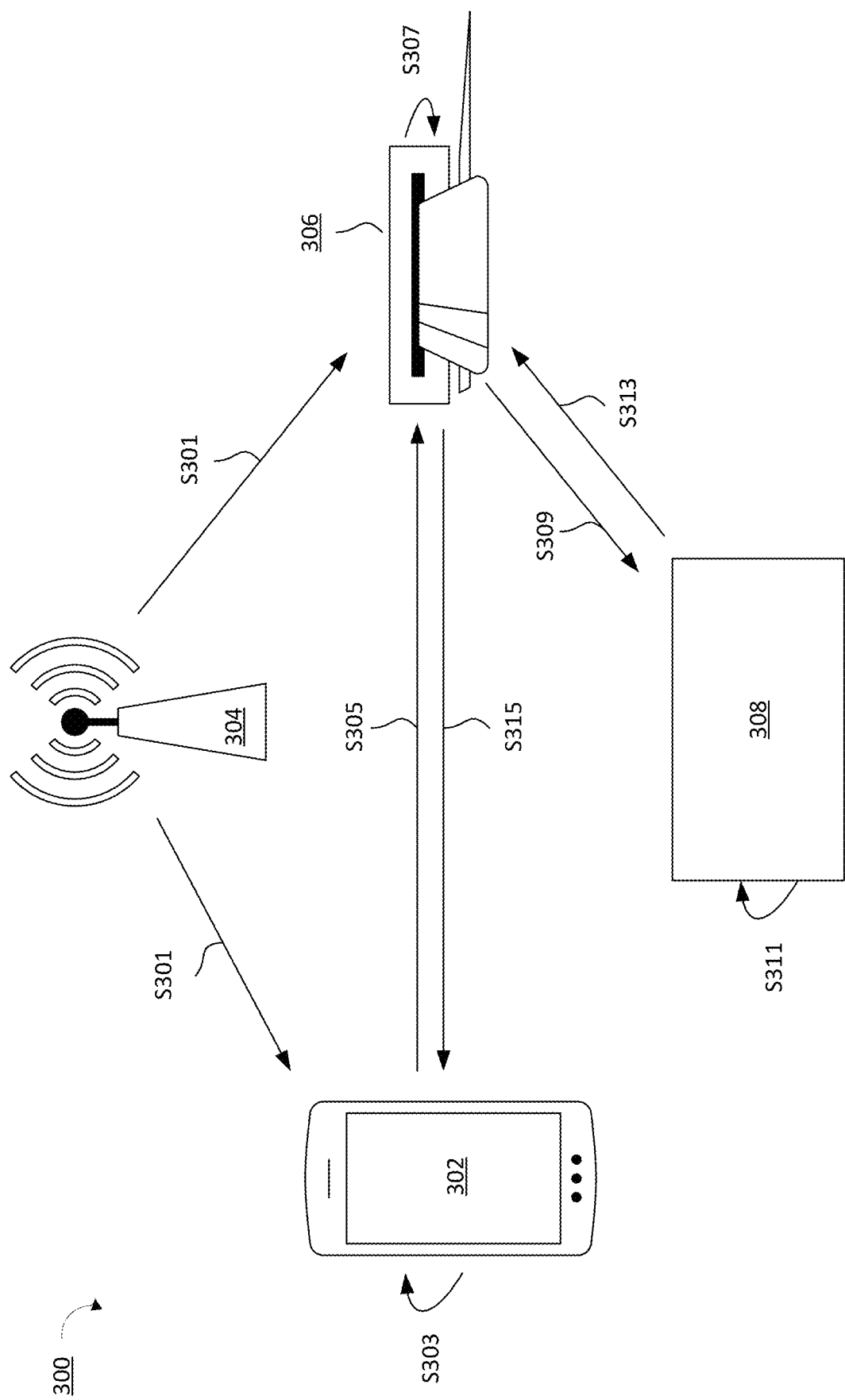
FIG. 3 illustrates a block diagram illustrating a method for preventing a man-in-the-middle attack using a single beacon transmitter, according to some embodiments.

FIG. 3. shows a system 300 for preventing attacks with one beacon transmitter. System 300 includes a single beacon transmitter 304, which may be substantially similar to the beacon transmitters 204A, 204B, 204C, described above with respect to FIG. 2. System 300 may further include a user device 302, access device 306, and processing system 308, which may be substantially similar to the user device 202, access device 206, and processing system 208, respectively, as described above with respect to FIG. 2.

At step S301, the beacon transmitter 304 may transmit a plurality of broadcast messages. The broadcast messages may include broadcast data such as a unique identifier corresponding to the beacon transmitter 304 and timestamp corresponding to the time at which the broadcast message is transmitted. The broadcast messages may be transmitted in randomly distributed time intervals.

The broadcast messages may be received by the user device 302 to include a characteristic sequence of randomly distributed timestamps. Thus, the set of broadcast messages received by a particular user device 302 in a particular visit to a location may correspond to a particular unique footprint. For example, if the user was in a store at 11 AM, the beacon transmitter 304 may transmit a first set of broadcast messages to the user device 302, in a first set of intervals spaced apart in a first manner (e.g., 100 ms apart or 150 ms apart). If a fraudster were in the same store at 1 PM, the beacon transmitter 304 may transmit a second set of broadcast messages to the fraudster's device in a second set of intervals spaced apart in a second manner which differs from the first manner (e.g., 50 ms or 200 ms apart). Accordingly, it would be very difficult for the fraudster to duplicate the footprint, even by adjusting the timestamps forward by two hours, as the modified random intervals would be very difficult to predict.

The broadcast messages received by the user device 302 may further be received by the access device 306, along with additional broadcast messages. The access device 306 may store the unique identifier, random number, and/or other broadcast data in association with each respective timestamp (e.g., to a database such as broadcast database 422 shown in FIG. 4).

At step S303, the user device 302 may generate an access request. The user device 302 may package together a set of received timestamps. The package may further include unique identifiers and/or other broadcast data corresponding to each of the received timestamps. The user device 302 may cryptographically sign the timestamps, unique identifiers, and/or random numbers, as described above with respect to FIG. 2. The user device may further additional data, such as access data, in the access request.

At step S305, the user device 302 transmits the access request to the access device 306. The user device 302 may transmit the access request to the access device over short range communication such as BLE. The access device 306 receives the access request.

At step S307, the access device 306 verifies that the stored timestamps, unique identifiers, and/or random numbers match the timestamps, unique identifiers, and/or random numbers received from the user device 302. The access device 306 may query the broadcast database to determine whether corresponding timestamps, unique identifiers, and/or random numbers are stored therein. The access device 306 may authenticate the access request based on verifying that a subset of the stored broadcast data matches the received broadcast data. If the unique identifiers and timestamps are in a form of a cryptogram, then the access device 306 may validate the cryptogram. In some embodiments, the cryptogram could be decrypted with a cryptographic key to obtain the unique identifiers and timestamps. This data may be compared to the stored unique identifiers and timestamps to determine whether there is a match. In other embodiments, a separate cryptogram may be calculated by the access device 306 (using the broadcast data, and an appropriate cryptographic key) and this may be compared with the received cryptogram to determine if there is a match. In this example, the separate cryptogram may be generated using a symmetric key, and a corresponding symmetric key may be stored on the user device 302 and may have been used to generate the received cryptogram. In yet other embodiments, the received cryptogram was generated using a private key of a public/private key pair. The received cryptogram can be validated with a public key, a verification algorithm, and the broadcast data. Public key verification methods are known in the art.

At step S309, the access device 306 may prepare and transmit an authorization request message to the processing system 308. The authorization request message may comprise access data, broadcast data, and/or the like. The authorization request message may further comprise a flag or other indicator that the access device 206 has authenticated the access request. The access device 306 may transmit the authorization request message to the processing system 308 over a network.

At step S311, the processing system 308 may execute transaction processing operations. Executing transaction processing operations may comprise receiving an authorization request message from an access device 306, and/or from a transport computer (not shown). For example, the access device 306 may transmit the authorization request message to a transport computer, which forwards the authorization request message to the processing system 308. Executing transaction processing operations may further comprise transmitting the authorization request message to an authorizing entity computer (e.g., a computer associated with a bank that issued a payment account to the user attempting to make a purchase). The processing system may then receive an authorization response message comprising a determination whether to approve or decline the access request. Alternatively, or additionally, the processing system 308 may itself determine whether to authorize the transaction, and generate an authorization response message indicating whether to approve or decline the access request. The authorization operations may be caused by, and/or rely on, the fact that the access device 306 has authenticated the access request at step S307.

At step S313, the processing system 308 transmits the authorization response message to the access device 306. The processing system 308 may transmit the authorization response message to the access device 306 over a network, e.g., as a message and/or API push. The authorization response message, indicating whether the access request was approved or declined, is received by the access device 306.

At step S315, the access device 306 may transmit a message to the user device 302 indicating the results (e.g., whether the access request was approved or declined). If the access request was approved, then the access device 306 may transmit a confirmation message to the user device 302 indicating approval. If the access request was declined, then the access device 306 may transmit a notification to the user device 302 indicating the decline.

At the end of the day or at some other period of time, a clearing and settlement process can take place.

IV. System Details

A. Access Device

Figure 4:
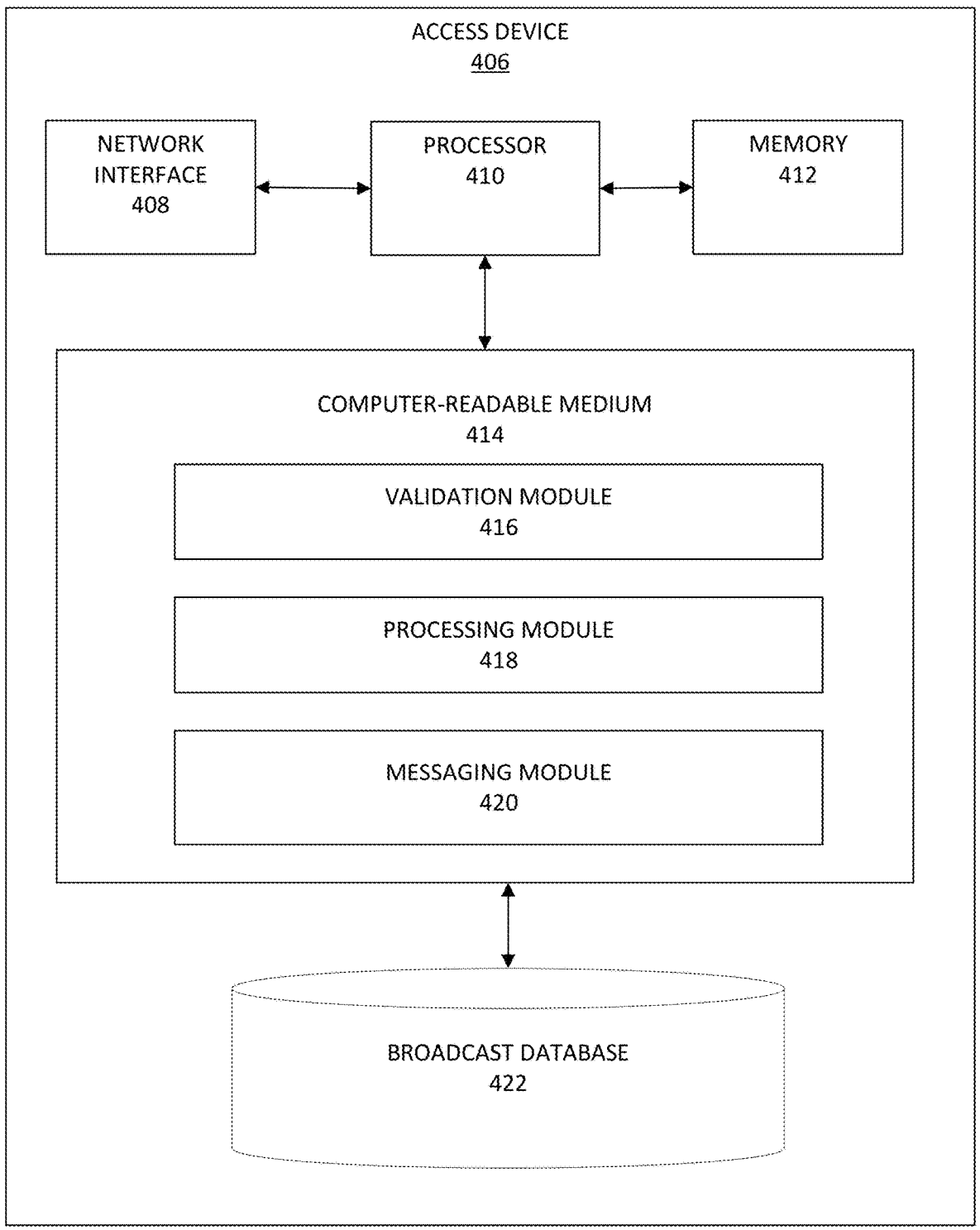
FIG. 4 shows a block diagram of an access device, according to some embodiments.

FIG. 4 shows a detailed view of an access device 406. The access device 406 may include a processor 410 operatively coupled to a network interface 408, a memory 412, a computer-readable medium 414, and a broadcast database 422.

For simplicity of illustration, a certain number of components are shown in FIG. 4. It is understood, however, that embodiments may include more than one of each component. In addition, some embodiments may include fewer than or greater than all of the components shown in FIG. 4.

The network interface 408 can be configured to connect to one or more communication networks to allow the access device 406 to communicate with other entities such as the user device 202, the processing system 208, the beacon transmitter(s), etc.

The processor 410 may be implemented as one or more integrated circuits (e.g., one or more single core or multicore microprocessors and/or microcontrollers). The processor 410 may be used to control the operation of the access device 406. Processor 410 can execute a variety of programs in response to program code or computer-readable code stored in memory 412. Processor 410 may include functionality to maintain multiple concurrently executing programs or processes.

The memory 412 may be implemented using any combination of any number of non-volatile memories (e.g., flash memory) and volatile memories (e.g., DRAM, SRAM), or any other non-transitory storage medium, or a combination of media.

The computer-readable medium 414 may be a non-transitory computer readable medium, and may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 414 may be any combination of such storage or transmission devices.

In some embodiments, the computer-readable medium 414 comprises code, executable by the processor 410, to implement a method comprising: receiving, at an access device from one or more beacon transmitters, plurality of broadcast messages, each broadcast message, of the plurality of broadcast messages, comprising a timestamp and a unique identifier for a beacon transmitter, of the one or more beacon transmitters; storing, by the access device, the timestamps and the unique identifiers; receiving, at the access device from a user device, an access request comprising timestamps and unique identifiers corresponding to a subset of the broadcast messages received by the access device; verifying, by the access device, that the stored timestamps and unique identifiers match the timestamps and unique identifiers received from the user device; and based on the verifying, authenticating, by the access device, the access request.

The computer-readable medium 414 may comprise software code stored as a series of instructions or commands The computer-readable medium 414 may comprise a validation module 416, a processing module 418, and a messaging module 420.

The validation module 416 may include code for managing validation operations. The validation module 416 may include functionality to, in cooperation with the processor 410, initiate validation of broadcast data, either directly or via a request to a remote server computer. The validation module 416 may be communicatively coupled to a memory for storing broadcast data such as timestamps, unique identifiers, and/or random numbers (e.g., the broadcast database 422). The validation module 416 may include code for querying the broadcast database 422 for broadcast data, based on broadcast data received. For example, the validation module 104F may include code for generating a query (e.g., a Structured Query Language (SQL) query) to identify whether the database contains a broadcast from beacon device A at timestamp T1, a broadcast from beacon device B at timestamp T2, and a broadcast from beacon device C at timestamp T3. The validation module 416 may further include code for determining whether to validate received broadcast data. For example, if the result of the above query is "yes," then the received broadcast data is validated. If the result of the query is "no," then the received broadcast data is not validated.

The processing module 418 may comprise code for processing an access request in conjunction with the processor 410. The processing module 418 may include code for generating an authorization request message in conjunction with the processor 410, based on access data and broadcast data received in an interaction with a user device.

The messaging module 420 may comprise code for transmitting messages in conjunction with the processor 410. The messaging module 420 may further be configured to accept and analyze messages in conjunction with the processor 410. The messaging module 420 may include functionality to receive and transmit messages containing broadcast data (e.g., timestamps, unique identifiers and/or random numbers), interaction data, and/or access data in conjunction with the processor 410.

The broadcast database 422 may be a storage unit and/or device (e.g., a file system, database, collection of tables, or other storage mechanism) for storing data. The broadcast database 422 may include multiple different storage units and/or devices. The broadcast database 422 may store broadcast data such as timestamps and unique identifiers and/or random numbers which have been received by the access device from one or more beacon transmitters. For example, the broadcast database 422 may store an array of broadcast data. Each row in the array may correspond to a unique broadcast message. The columns in the array may correspond to broadcast data retrieved from each respective broadcast message (e.g., one column for timestamps, one column for unique identifiers, etc.). The broadcast database 422 may be remote from the access device 406 (e.g., on the cloud). Alternatively, or additionally, the broadcast database 422 may be local to the access device 406.

B. User Device

Figure 5:
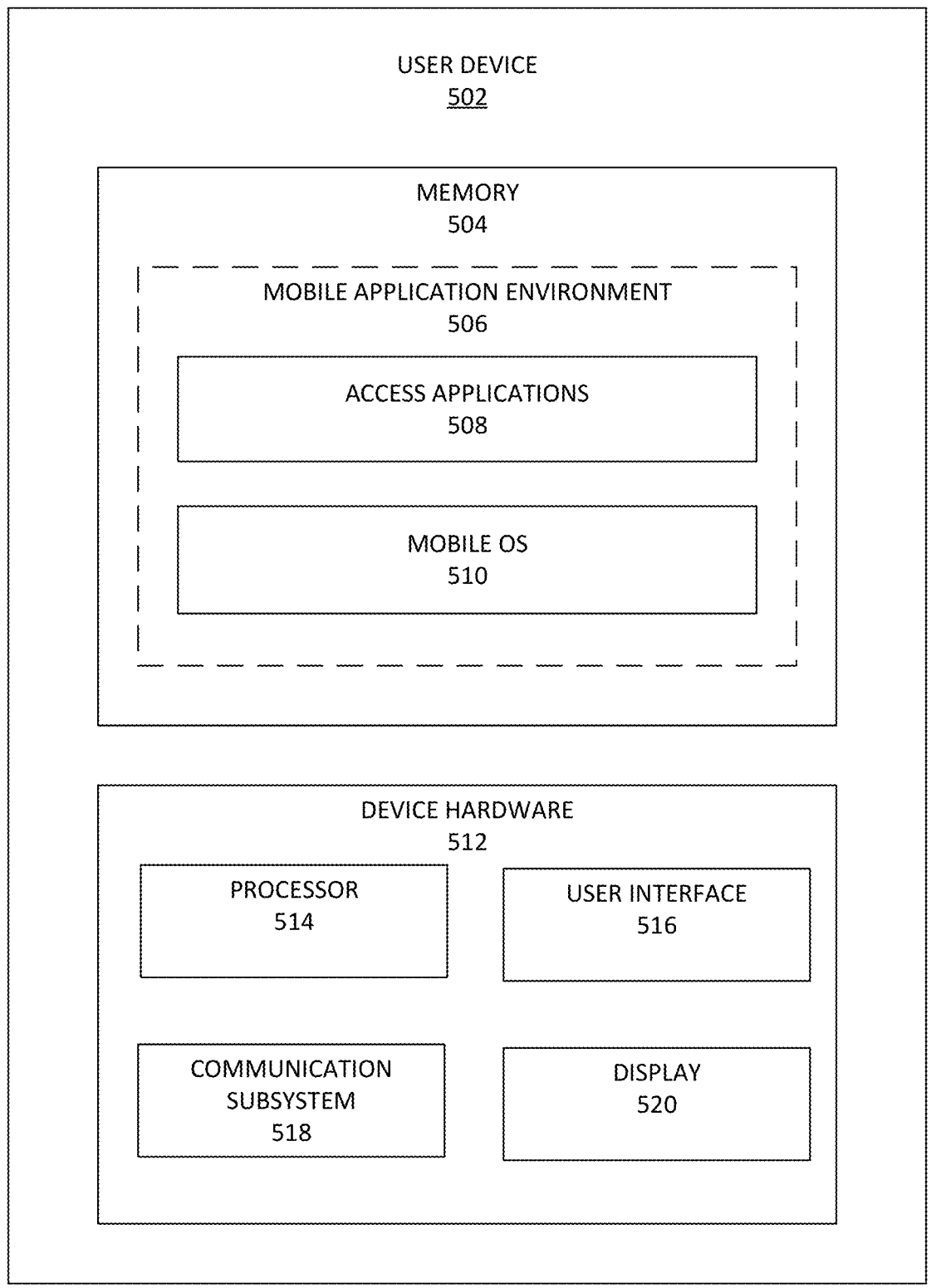
FIG. 5 shows a block diagram of a user device, according to some embodiments.

FIG. 5 shows a detailed view of a user device 502. The user device 502 may include hardware and/or software configured to prepare an access request including information received from one or more beacon transmitters. The user device 502 may include a memory 504 coupled to device hardware 512.

For simplicity of illustration, a certain number of components are shown in FIG. 5. It is understood, however, that embodiments may include more than one of each component. In addition, some embodiments may include fewer than or greater than all of the components shown in FIG. 5.

The device hardware 512 may include a processor 514, a communication subsystem 518, user interface 516, and a display 520. Processor 514 can be implemented as one or more integrated circuits (e.g., one or more single core or multicore microprocessors and/or microcontrollers), and is used to control the operation of user device 502. Processor 514 can execute a variety of programs in response to program code or computer-readable code stored in memory 504, and can maintain multiple concurrently executing programs or processes. Communication subsystem 518 may include one or more Radio-Frequency (RF) transceivers and/or connectors that can be used by user device 502 to communicate with other devices and/or to connect with external networks. User interface 516 can include any combination of input and output elements to allow a user to interact with and invoke the functionalities of user device 502. In some embodiments, display 520 may be hardware and/or software configured to display information to the user (e.g., a screen).

The memory 504 can be implemented using any combination of any number of non-volatile memories (e.g., flash memory) and volatile memories (e.g., DRAM, SRAM), or any other non-transitory storage medium, or a combination thereof media. Memory 504 may store a mobile Operating System (OS) 510 (e.g., an operating system for the user device 502).

The memory 504 may further comprise a mobile application environment 506. One or more access applications 508 may reside in the mobile application environment 506. Such access applications may be configured for managing access requests. Examples of access applications include a mobile wallet application, resource provider application, mobile location application, etc. An access application 508 may further be configured to, in conjunction with the processor 514, manage short-range interactions. For example, an access application 508 may include code for placing the user device 502 in a listening mode to monitor for BLE broadcasts, and code for placing the user device 502 in an intent-to-pay mode for transmitting an access request to an access device.

V. Example Embodiment

Figure 6:
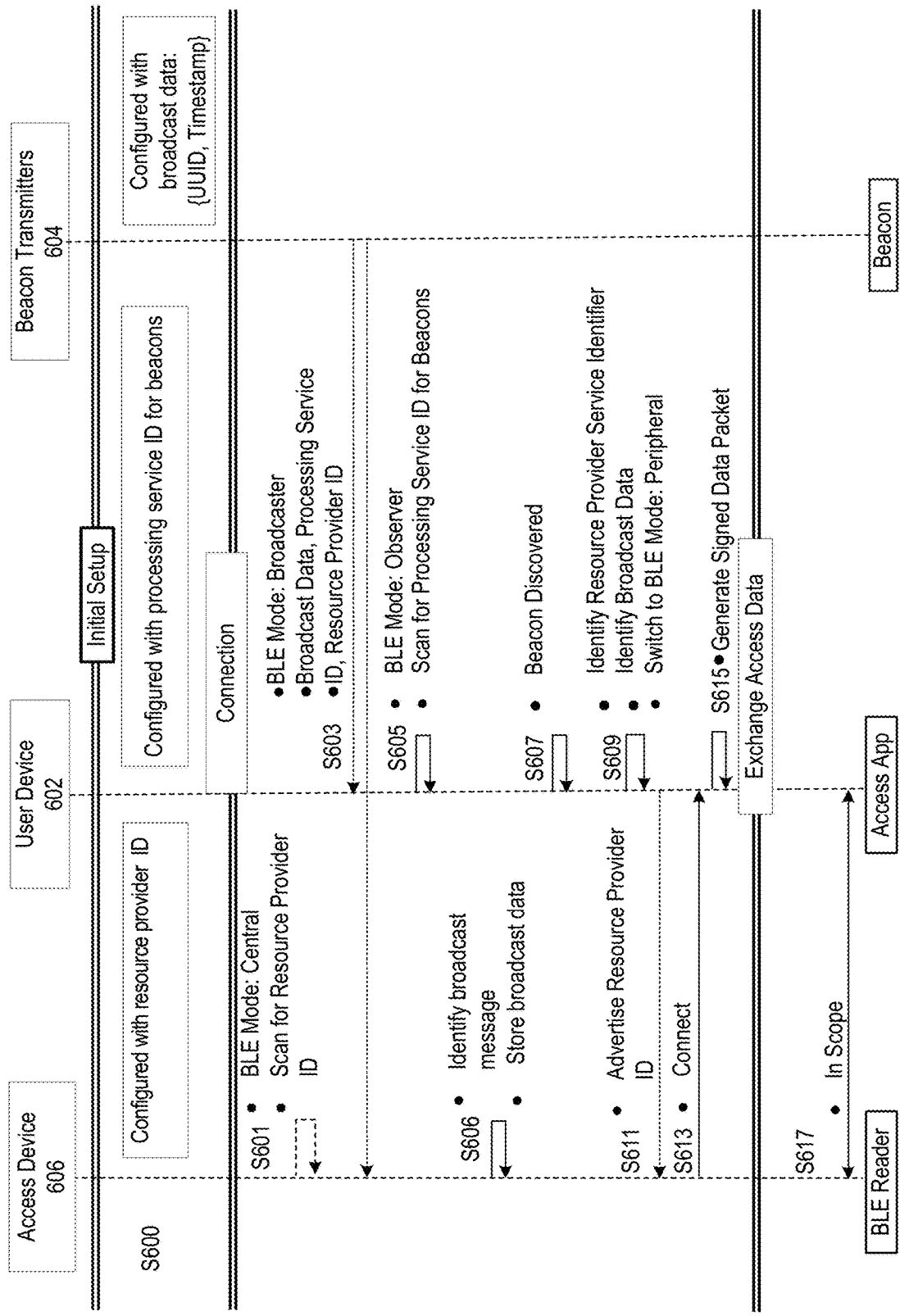
FIG. 6 shows a sequence diagram illustrating a method for preventing a man-in-the-middle attack, according to some embodiments.

FIG. 6 shows a sequence diagram illustrating a method for preventing a man-in-the-middle attack, according to some embodiments. The method may be performed by a user device 602, an access device 606, and a plurality of beacon transmitters 604. These entities may be substantially similar to the user devices (202, 302, 502), access devices (206, 306, 406), and beacon transmitters (204A, 204B, 204C, 304) described above.

At step S600, initial setup may occur for each of the devices. The initial setup may occur prior to initiating an access request. The access device 606 may be configured with a resource provider service identifier (ID) to distinguish the access device 606 from other access devices. The access device 606 may further be configured with data corresponding to the beacon transmitters, such as the unique identifier of each of the beacon transmitters 604.

The user device 602 may be configured with a processing service ID for beacons. The processing service ID may identify a particular processing service (e.g., Visa®) to handle generation and processing of the access request. At some initial time, a user may enroll the user device 602 in the processing service by downloading an access application (e.g., a payment application, mobile wallet application, etc.) onto the user device 602.

The beacon transmitters 604 may be configured with broadcast data. Each beacon transmitter may be assigned a unique identifier (e.g., a UUID) which is unique to the beacon transmitter. The beacon transmitters 604 may further be configured to include, in each advertisement, a timestamp formatted in a particular manner. Once the devices are in the same place (e.g., a store or a secure location to which the user seeks access), connection operations may be initiated.

At step S601, the access device 606 scans for the resource provider service identifier. The access device 606 may remain in a listening mode until a broadcast is received with the resource provider service identifier with which the access device 606 has been configured. For example, broadcasts from the beacon transmitters 604 and access requests from the user device 602 may include the resource provider service identifier.

At step S603, the beacon transmitters 604 may transmit broadcast messages comprising broadcast data. The broadcast messages may comprise broadcast data such as unique identifiers, timestamps, and/or random numbers. The broadcast data may further comprise a processing service ID and a resource provider ID. The beacon transmitter(s) may transmit the broadcast data, for example, via a BLE broadcast, as described above in section III.

At step S605, the user device 602 is in BLE Mode: Observer. The user device 602 may scan for broadcasts while in this observer mode. Such broadcasts may include the processor service ID.

At step S606, the access device 606 identifies a broadcast message comprising the resource provider ID. When such a broadcast message is received, this indicates that a beacon transmitter 604 which is associated with the access device 606 has transmitted the broadcast message. Accordingly, the access device 606 may store some or all of the broadcast data within the broadcast message to the broadcast database for later use in verifying an access request.

At step S607, the user device 602 discovers one or more beacons. The user device 602 may receive a plurality of broadcast messages from the beacon transmitters 604. The user device 602 may discover different broadcasts from different beacon transmitters 604 at different times, e.g., as the user of the user device 602 walks through a store and enters the range of a set of beacon transmitters 604. Alternatively, or additionally, the user device 602 may discover multiple broadcast messages from a single beacon transmitter which is transmitting timestamped broadcast messages in predetermined intervals.

At step S609, the user device 602 identifies broadcast data within the broadcast message(s). The user device 602 identifies the resource provider service identifier. The resource provider service identifier identifies the resource provider associated with the beacon transmitters 604 and the access device 606. The user device 602 may parse the received broadcast to identify and extract the resource provider service identifier. For example, the resource provider service identifier is the first 16 bytes of beacon broadcasts according to some protocols. The user device 602 may use the resource provider service identifier to identify the access device, of a plurality of potential access devices, to which to transmit the access request.

The user device 602 further identifies the broadcast data which was broadcasted by the beacon transmitter(s), such as a unique identifier, timestamp, random number, and/or the like. The broadcast data may be identified, parsed and extracted from the broadcast message.

At step S611, the user device 602 may advertise the resource provider service identifier. The user device 602 may transmit a broadcast message comprising the resource provider service identifier.

At step S613, the access device 606 identifies the message transmitted by the user device 602 at step S611, as it is scanning for the resource provider ID contained in the message transmitted by the user device 602. The access device 606 connects to the user device 602. The access device 606 and the user device 602 may establish a secure connection for initiating an access request.

At step S615, the user device 602 generates an access request message, which may comprise a signed data packet. The user device generates a cryptogram based on the timestamps and unique identifiers received from the beacon transmitters 604, using a private key of the user device 602. The access request message and/or signed data packet may further include access data such as an account identifier for the transaction.

At step S617, the user device 602 and the access device 606 may exchange access data to initiating the access request. The access device 606 may transmit, to the user device 602, the access request/signed data packet generated at step S615.

After step S617, the access device may validate the broadcast data and proceed with processing the access request, as described above in Section III.

VI. Technical Benefits

Embodiments of the invention provide for a number of advantages. One or more beacon transmitters are used to create a unique footprint associated with interactions between a user device and the beacon transmitter(s) (e.g., BLE beacons). Because the unique footprint characterizes multiple timestamped broadcast messages, which may come from multiple beacon transmitters, the footprint is very difficult to replicate (e.g., by a fraudster attempting a man-in-the-middle attack). This unique footprint is transmitted to, and validated by, an access device for potentially granting access to a resource. By validating the unique footprint of the user device, valid requests from the user device can be distinguished from fraudulent requests from another intercepting device. In this manner, data security is enhanced by preventing relay attacks, replay attacks, or other man-in-the-middle attacks that would otherwise enable a fraudster to gain access to sensitive information for fraudulent purposes. Accordingly, the security of data transmissions over a network is improved, by using measures to prevent fraudulent use of the data in the transmissions.

Embodiments of the invention provide for a number of additional advantages. Using BLE beacons to create the unique footprint is advantageous because BLE beacons are relatively low-cost, low-energy-consumption devices. Accordingly, in some embodiments, multiple BLE beacons can be placed throughout a location while keeping cost and energy consumption low.

It should be understood that any of the embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to some embodiments may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the embodiments will become apparent to those skilled in the art upon review of the disclosure. The scope of the embodiments should, therefore, be determined not with reference to the above description, but instead should be determined with reference to the pending claims along with their full scope or equivalents.

One or more features from any embodiment may be combined with one or more features of any other embodiment without departing from the teachings of this disclosure.

A recitation of "a," "an," or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, at a first device from one or more beacon transmitters, a plurality of broadcast messages, each broadcast message, of the plurality of broadcast messages, comprising a timestamp and a unique identifier of a beacon transmitter, of the one or more beacon transmitters;
   storing, by the first device, the timestamps and the unique identifiers;
   receiving, at the first device from a second device, a request comprising timestamps and unique identifiers corresponding to a subset of the broadcast messages received by the first device;
   verifying, by the first device, that the stored timestamps and unique identifiers match the timestamps and unique identifiers received from the second device; and
   based on the verifying, authenticating, by the first device, the request.

2. The method of claim 1, wherein the plurality of broadcast messages are received from a plurality of respective beacon transmitters, each beacon transmitter comprising a different unique identifier.

3. The method of claim 1, wherein the plurality of broadcast messages are received from one beacon transmitter at one or more randomly distributed time intervals.

4. The method of claim 1, wherein the timestamps and the unique identifiers received from the second device are in a form of a cryptogram, and wherein the verifying comprises decrypting the cryptogram to recover the timestamps and the unique identifier, and comparing the recovered timestamps and the unique identifier to the stored timestamps and unique identifiers.

5. The method of claim 1, wherein the unique identifier comprises a random number.

6. The method of claim 1, further comprising, based on authenticating the request:
   transmitting an authorization request message to a processing system, wherein the processing system initiates authorization operations for the request.

7. The method of claim 1, further comprising identifying, by the first device, the stored timestamps and unique identifiers corresponding to the subset of the broadcast messages received by the second device.

8. A first device comprising:
   a processor; and
   a non-transitory computer-readable medium comprising code, executable by the processor, for implementing a method comprising:
   receiving, at the first device from one or more beacon transmitters, a plurality of broadcast messages, each broadcast message, of the plurality of broadcast messages, comprising a timestamp and a unique identifier of a beacon transmitter, of the one or more beacon transmitters;
   storing, by the first device, the timestamps and the unique identifiers;
   receiving, at the first device from a second device, a request comprising timestamps and unique identifiers corresponding to a subset of the broadcast messages received by the first device;
   verifying, by the first device, that the stored timestamps and unique identifiers match the timestamps and unique identifiers received from the second device; and
   based on the verifying, authenticating, by the first device, the request.

9. The first device of claim 8, wherein the plurality of broadcast messages are received from a plurality of respective beacon transmitters, each beacon transmitter comprising a different unique identifier.

10. The first device of claim 8, wherein the plurality of broadcast messages are received from one beacon transmitter at one or more randomly distributed time intervals.

11. The first device of claim 8, wherein the timestamps and the unique identifiers received from the second device are in a form of a cryptogram, and wherein the verifying comprises decrypting the cryptogram to recover the timestamps and the unique identifier, and comparing the recovered timestamps and the unique identifier to the timestamps and unique identifiers.

12. The first device of claim 8, wherein the unique identifier comprises a random number.

13. The first device of claim 8, the method further comprising, based on authenticating the request:
   transmitting an authorization request message to a processing system, wherein the processing system initiates authorization operations for the request.

14. The first device of claim 8, the method further comprising identifying, by the first device, the stored timestamps and unique identifiers corresponding to the subset of the broadcast messages received by the second device.

15. A method comprising:
   transmitting, by a beacon device to a user device and an access device, a plurality of broadcast messages, each broadcast message of the plurality of broadcast messages comprising a timestamp and a unique identifier of the beacon device,
   wherein the access device:
   receives, from the user device, an access request comprising a set of timestamps and the unique identifier corresponding to the plurality of broadcast messages transmitted to the user device;

verifies that a set of timestamps and the unique identifier corresponding to the plurality of broadcast messages transmitted to the access device match the set of timestamps and the unique identifier received from the user device; and based on the verifying, authenticates the access request.

16. The method of claim 15, wherein the beacon device transmits the plurality of broadcast messages at randomly distributed time intervals to include a characteristic sequence of timestamps.

17. The method of claim 15, the plurality of broadcast messages comprising:
a first set of broadcast messages in a first set of intervals spaced apart in a first manner; and
a second set of broadcast messages in a second set of intervals spaced apart in a second manner.

18. The method of claim 15, the beacon device being a first beacon device and the plurality of broadcast messages being a first plurality of broadcast messages, the method further comprising:

transmitting, by a second beacon device to the user device and the access device, a second plurality of broadcast messages, each broadcast message of the second plurality of broadcast messages comprising a timestamp and a unique identifier of the second beacon device;

wherein the verifying is further based on the second plurality of broadcast messages.

19. The method of claim 15, wherein the timestamps and the unique identifier received from the user device are in a form of a cryptogram, and wherein the verifying comprises decrypting the cryptogram to recover the timestamps and the unique identifier, and comparing the recovered timestamps and the unique identifier to the timestamps and unique identifier from the broadcast messages transmitted to the access device.

20. The method of claim 15, wherein each broadcast message further includes a different randomly generated number.

* * * * *